US011301895B2

(12) United States Patent
Bitoun et al.

(10) Patent No.: US 11,301,895 B2
(45) Date of Patent: *Apr. 12, 2022

(54) SERVER-SIDE CONTENT MANAGEMENT

(71) Applicant: A9.com, Inc., Palo Alto, CA (US)

(72) Inventors: Lionel Bitoun, Palo Alto, CA (US); Bryan Thomas Quinn, Belmont, CA (US)

(73) Assignee: A9.COM, INC., Palo Alto, CA (US)

(*) Notice: Subject to any disclaimer, the term of this patent is extended or adjusted under 35 U.S.C. 154(b) by 78 days.

This patent is subject to a terminal disclaimer.

(21) Appl. No.: 16/773,721

(22) Filed: Jan. 27, 2020

(65) Prior Publication Data
US 2020/0160383 A1  May 21, 2020

Related U.S. Application Data

(63) Continuation of application No. 15/243,560, filed on Aug. 22, 2016, now Pat. No. 10,559,003.

(51) Int. Cl.
*G06Q 30/00* (2012.01)
*G06Q 30/02* (2012.01)
*H04L 67/01* (2022.01)
*H04L 67/1095* (2022.01)
*H04L 29/06* (2006.01)

(52) U.S. Cl.
CPC ..... *G06Q 30/0253* (2013.01); *G06Q 30/0267* (2013.01); *H04L 63/08* (2013.01); *H04L 67/1095* (2013.01); *H04L 67/42* (2013.01)

(58) Field of Classification Search
CPC  G06Q 30/0253; G06Q 30/0267; H04L 63/08; H04L 67/1095; H04L 67/42
See application file for complete search history.

(56) References Cited

U.S. PATENT DOCUMENTS

| | | | |
|---|---|---|---|
| 8,571,930 B1 | 10/2013 | Galperin | |
| 10,134,058 B2 | 11/2018 | Dasdan | |
| 2009/0144159 A1 | 6/2009 | Bashyam | |
| 2012/0246003 A1 | 9/2012 | Hart | |
| 2012/0265609 A1 | 10/2012 | Robert | |
| 2016/0360245 A1* | 12/2016 | Sanghavi | H04N 21/812 |
| 2017/0032412 A1 | 2/2017 | Scharber | |

OTHER PUBLICATIONS

Non-Final Office Action issued in U.S. Appl. No. 15/243,560 dated Jun. 11, 2019.
Notice of Allowance issued in U.S. Appl. No. 15/243,560 dated Oct. 10, 2019.

* cited by examiner

*Primary Examiner* — Meredith A Long
(74) *Attorney, Agent, or Firm* — Hogan Lovells US LLP

(57) ABSTRACT

Supplemental content can be determined through a server-side process, wherein a primary content provider can obtain the supplemental content from a supplemental content provider before any of the content is sent to the client device initially requesting the primary content. A primary content provider submits a request that can include an authorization token for the primary content provider, a publisher token including a proxy identifier for the user, application, or client device, and other relevant information. The supplemental content provider can verify the information and select targeted content based on the information. The supplemental content can then be provided to the primary content provider for incorporation with the primary content. The primary content provider can adjust the layout or selection before sending to the client device for display.

20 Claims, 7 Drawing Sheets

SERVER-SIDE CONTENT MANAGEMENT

CROSS REFERENCE TO RELATED APPLICATIONS

This application is a continuation of U.S. application Ser. No. 15/243,560 filed Aug. 22, 2016, titled "SERVER-SIDE CONTENT MANAGEMENT", the full disclosure of which is hereby incorporated herein by reference in its entirety for all purposes.

BACKGROUND

As the number of users viewing information and purchasing items electronically increases, there is a corresponding increase in the amount of advertising revenue spent in electronic environments. In some cases, advertisements are targeted based on various criteria so that a user viewing an advertisement will be more likely to view additional content related to the advertisement, or in the case of advertising an item or product, will be more likely to purchase or otherwise consume the advertised item. The advertising content is typically requested by the display device in order to enable that device to display the advertising along with primary content to be displayed on the device. Submitting requests for advertising content after receiving the primary content can increase latency and require additional bandwidth. Further, the advertising being requested from the user's device instead of the content provider limits the ability for the content provider to adapt the primary content based on the available advertising, which can impact the quality of the final display.

BRIEF DESCRIPTION OF THE DRAWINGS

Various embodiments in accordance with the present disclosure will be described with reference to the drawings, in which.

DETAILED DESCRIPTION

Figure 1A:
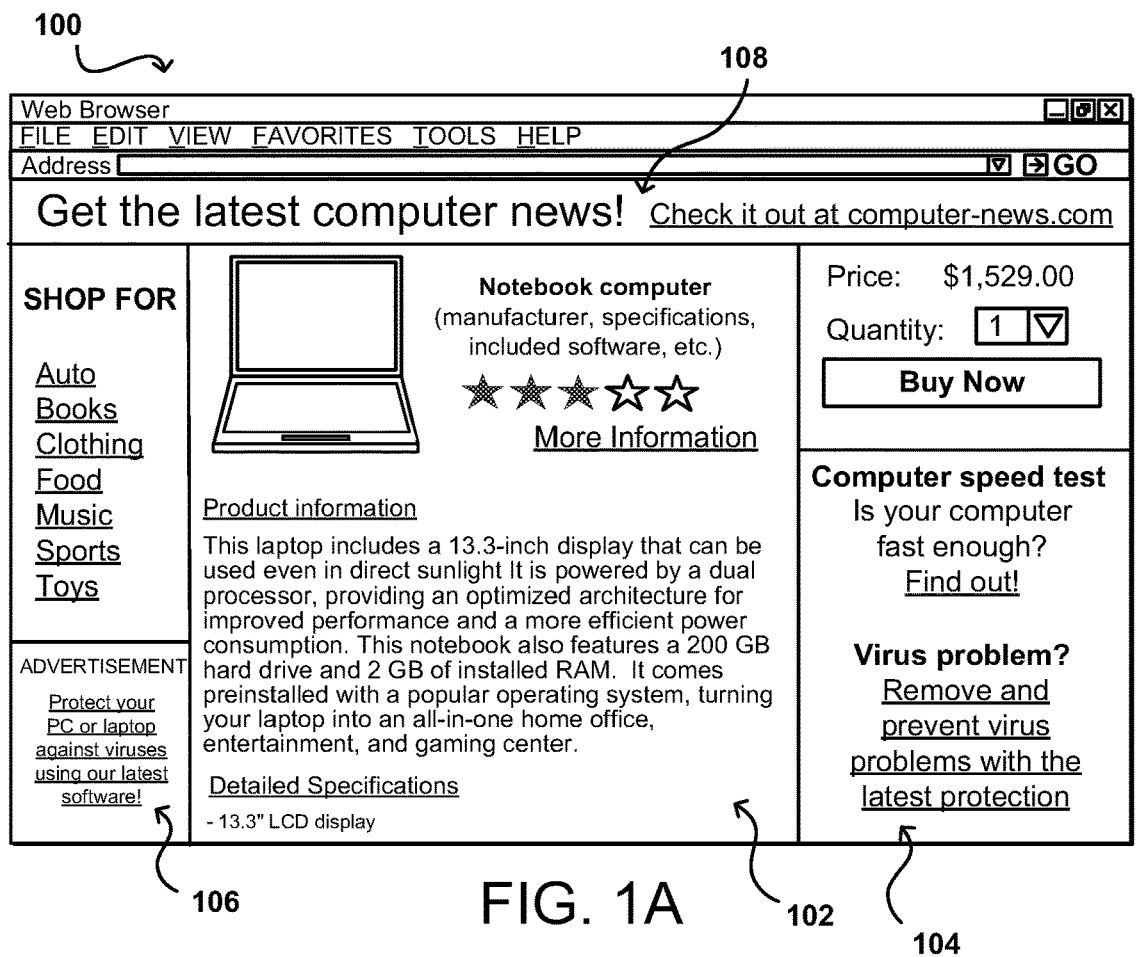
FIGS. 1A and 1B illustrate an example content displays including advertising that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the providing of supplemental content in an electronic environment. In particular, approaches provide for the server-side determination of supplemental content, such as advertising, that can be included with primary content to be presented via a client device. The advertising can be determined through communication between a primary content provider and a supplemental content provider, before any of the primary content is sent to the client device. A primary content provider can submit a request for supplemental content to a supplemental content provider, such as an ad publisher. The request can include information such as a source address, a link to the primary content, and an authorization used to verify the source of the request. The request can also include a publisher cookie, if available, that includes an identifier for the user, application, and/or device for which the supplemental content is being determined, in order to provide for targeted supplemental content. The request can be received to an application programming interface (API) or other interface of the supplemental content provider, and the supplemental content provider can use the information received with the request to provide the supplemental content to the primary content provider. In some embodiments the supplemental content provider will provide all determined supplemental content to the primary content provider, while in other embodiments the supplemental content provider can provide information about relevant supplemental content, such as description, sizing, and price information, which can enable the primary content provider to determine which supplemental content to include. Once the primary content provider receives the supplemental content, the primary content provider has the option of modifying the layout of content to be displayed and/or the selection of content to be included, including both primary and supplemental content. The content can then be provided together for rendering or other display via the client device.

Various other such functions can be used as well within the scope of the various embodiments as would be apparent to one of ordinary skill in the art in light of the teachings and suggestions contained herein.

As mentioned, there are various ways in which users can access digital content. These include, for example, browsing content through an Internet browser, playing media through a media player or streaming application, accessing gaming content through a gaming application, obtaining electronic book content through a reader application, and the like. In many instances, a client device that is to present (e.g., display, play, or project) the content will submit a request for the content over an appropriate network, such as the Internet or a cellular network, and in response the client device will be able to download, stream, or otherwise obtain the content. The client device can play or otherwise display or present the content as it is being downloaded or streamed, or can store the content for playback at another time, among other such options. This content can be provided by a content provider associated with the requested content, where that provider can be the generator of the content or can obtain that content from a third party. The content specified by the request (or other such mechanism for obtaining the content) will be referred to herein as "primary content."

In many instances, there can be other content displayed or presented along with the primary content. This content can be related in some way to the primary content, and thus is referred to herein as "supplemental content." This supplemental content can include, for example, additional information about a video being played or purchasing information for items displayed in the primary content. In many instances at least some of this supplemental content will be advertising or promotional content. As an example, FIG. 1A illustrates an example display 100 of content wherein the primary content 102 relates to an item offered through consumption through an electronic marketplace. In many instances, a user will select a search result or navigation element displayed through the Internet browser, which will cause a request for primary content related to the item to be sent to a Web server address from which the primary content can be obtained. The primary content can then be displayed on the client device, such as through the appropriate panel, object, or widget of the webpage as displayed.

In this example, the webpage also includes areas 108 of supplemental content. The supplemental content here relates to advertising that has been selected for display based on various potential criteria, such as the specific primary content, device, user, location, time, etc. In many cases the code for the page will include one or more links or other such objects which specify locations from which to obtain the advertising, along with one or more parameter values, identifiers, or other such mechanisms for obtaining the appropriate advertising. When the page is loaded and/or rendered through the browser application, the link or address for each instance of supplemental content 104, 106, 108 can trigger the Internet browser to generate a separate request for the respective supplemental content. Once received, each instance of supplemental content can be displayed in its respective location on the page. The requests can be sent concurrently, or in parallel, and the supplemental content can be rendered as it is received.

Figure 1B:
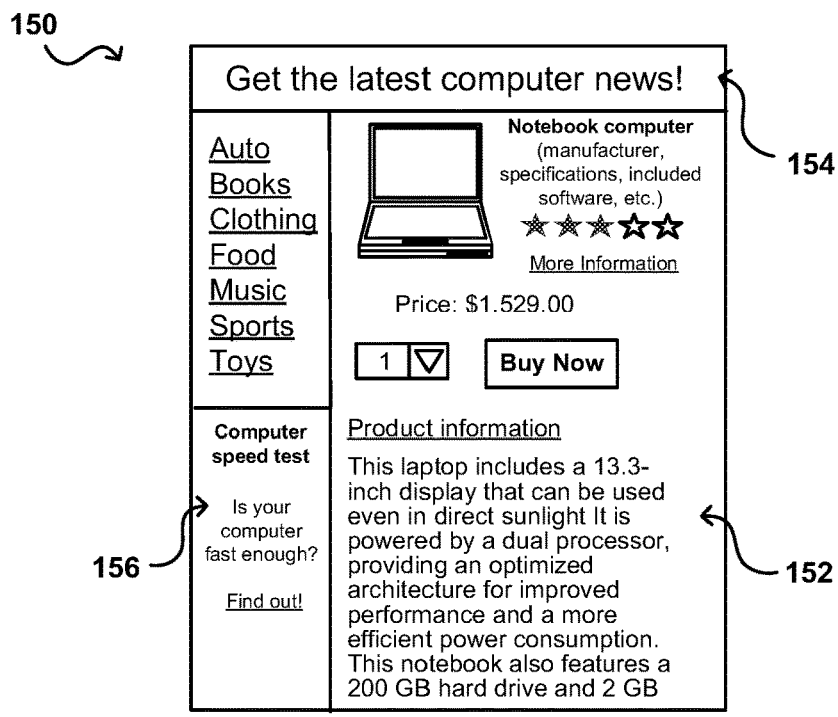

In addition to the supplemental content being selected based at least in part upon the primary content, user, and other such information, the supplemental content can also be displayed based at least in part upon the layout of the particular page upon which the primary content is to be displayed. For example, the display 150 of content illustrated in FIG. 1B shows only two advertisements 154, 156 with the primary content 152. Since the layout of the page is fixed before the advertising is requested, the content provider has very little ability to know which ads are ultimately displayed and thus can lack the ability to adjust the layout or selection of the content based on the ads. The content provider also will not have little ability to control or select the ad to be displayed based upon the advertising available to the client device. This can impact the overall look and impact of the content, and prevents the provider from having much control over the precise ads that are displayed.

Further, in order for the advertising to be usable on the page, the calls for the advertising should to be made before the primary content is rendered. Otherwise, there will be a delay in the display of advertising, and portions of the page appearing at different times, which can negatively impact user experience. Even so, there can be some delay in the displaying of supplemental content due to the need to make calls for the supplemental content after the primary content is at least partially received. In conventional approaches most digital advertising is processed through these browser-to-server calls or device-to-server calls to ad servers, which still requires a separate client-side call for advertising. These calls are "requests for ads" for the current page and for the current user, where an identity is typically encoded in a unique identifier ("ID") embedded in a browser cookie or a mobile device ID suitable for determining advertising content. These ad calls are usually expensive to process for browsers and devices, as a single page may require five to ten such ad calls, each of which initiates a connection to a remote ad server and thus taxes the browser or the device, in addition to requiring additional bandwidth.

Accordingly, approaches and methods in accordance with the various embodiments can attempt to provide server-side content management that enables the supplemental content to be determined before the primary content is sent to a client device, and can enable the supplemental content to be sent along with, or in parallel with, the primary content. One or more interfaces, such as supplemental content application programming interfaces (APIs) can be exposed to publishers or other primary content providers, which can be integrated with various content management systems and content-delivery networks. The supplemental content API can be called by the relevant content server or content delivery network, and the response can be embedded and/or encoded in the primary content.

A server-side API in many instances will not have an identifier, such as an advertising browser ID, device ID, or user ID, readily usable by the server-side components to represent the current user, etc. Without such an identifier, advertising server calls may not provide optimal advertising as there is no way to provide differentiated advertising that is targeted to the user or device. Accordingly, approaches in accordance with various embodiments can cause the supplemental content API to return a two-part response payload. One part of the payload is used for the advertising or supplemental content, which can be returned and encoded in a "header." A second, optional part of the payload can be used for automatically creating a usable browser ID or device ID that can be used for advertising, and synchronizing this identifier between the content provider and ad provider systems, where that ID can be returned and encoded as a "footer." Primary content publishers or providers can be instructed to emit the footer and header in the primary content at the appropriate locations. If and when the response footer renders, the browser or device can perform cause the advertising ID to be synchronized between the advertising system and a publisher cookie. The publisher cookie can be sent in the next server-side advertising call to represent the browser or device, thereby simulating a regular client-side ad call but without the latency cost associated with client-side calls.

Bringing supplemental content in real-time to the content server, or content provider system, also lays a foundation for more robust content-side optimization. Such an approach can unblock a large number of optimization methods, whereby portions of the primary content can be reorganized in real-time to include machine-learned ad recommendations, for example, to improve overall publisher monetization, even before the content is returned to the user. The API can be available to publishers for proprietary content systems and content-delivery networks (CDN) as special header and footer tags, among other such options.

Figure 2:
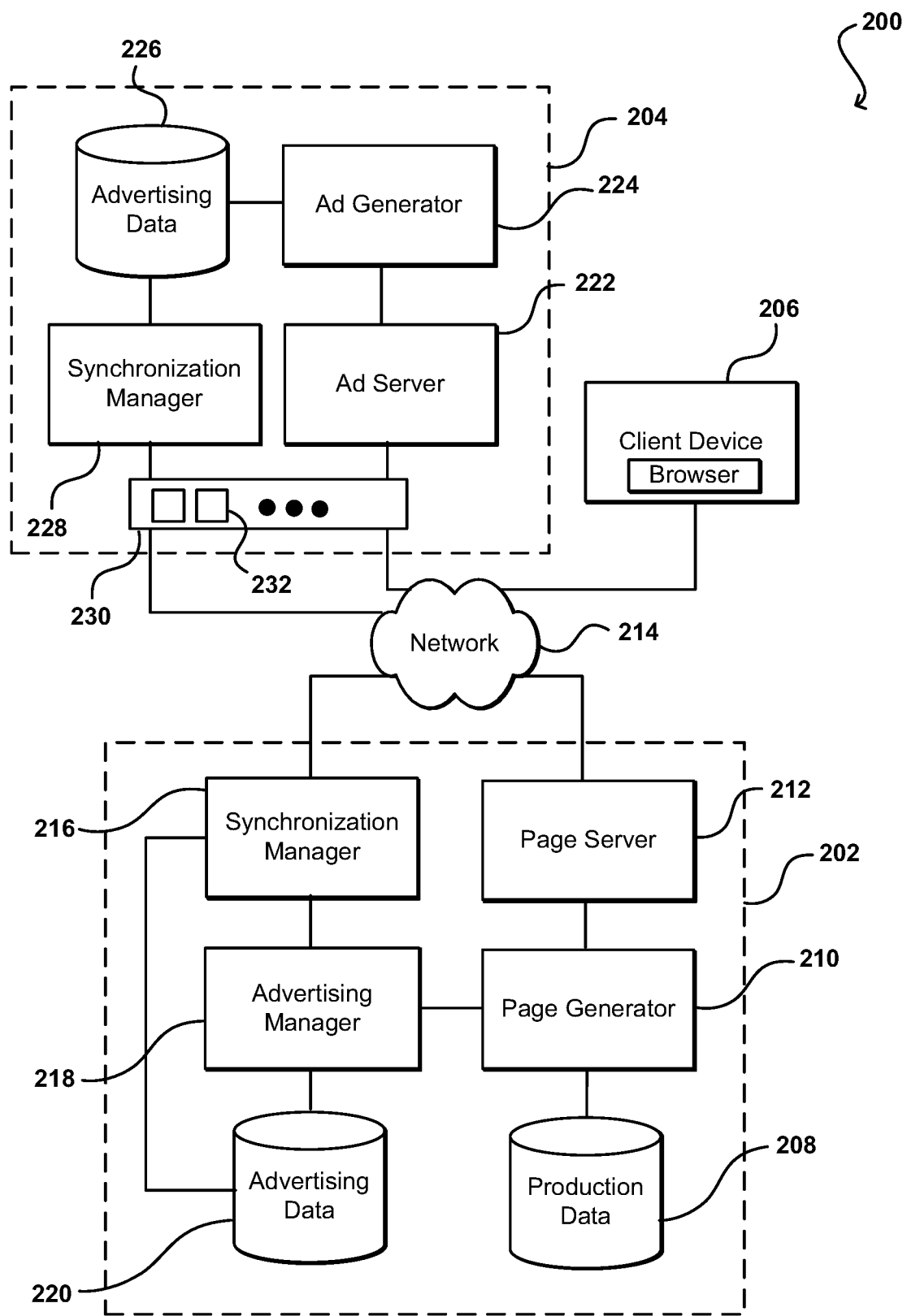
FIG. 2 illustrates an example system for providing advertising content with primary content that can be utilized in accordance with various embodiments.

FIG. 2 illustrates an example system 200 that can be used to provide primary and supplemental content for display in accordance with various embodiments. In this example, a primary content provider 202 can receive information for supplemental content, in this case advertising content, from at least one ad provider 204. In certain embodiments, the ad provider can be affiliated with, or part of, the primary content provider, while in other embodiments the ad provider can be a separate or third party provider. Components of the ad provider 204 and the content provider 202 can each provide information useful for advertising, such as keyword-landing page pairs, creative elements, ad selection, and bid prices.

In this example, the primary content provider 202 generates and serves pages of content available to any appropriate end user via an associated client device 206, and thus can include components such as a production data store 208 that can be used by a page generator 210 to generate pages that can be served by a page server 212 (such as a Web server in a Web-based environment) over at least one network 214 to be rendered by a browser or other such application executing on the client device 206. Similarly, various other providers can include components such as ad generator and ad server components for generating and serving advertisements to a user. While many of the embodiments are described with respect to a Web-based environment, it should be understood that pages are not limited to Web pages, but can include any application page or other interface page that can be displayed or otherwise conveyed to a user.

If the ad provider system 204 wishes to advertise with the provider 202 using sponsored links or other advertisements that direct a client device back to a page provided by the advertising entity, the advertising entity also can include components for determining the landing pages to be associated with the advertisements. While various advertising components in this example are shown to be part of the advertiser's system, it should be understood that these components can be part of a separate system or provided as a third party service, for example. In this example, the content provider system includes an advertising manager 218, which can encompass, monitor, and/or control a number of different algorithms and components for selecting and deciding upon pages on which to display ads, as well as dynamically determining when to show certain ads and selecting appropriate ads to show for each category, classes of users, specific items, etc. When the advertising manager 218 decides on an advertisement to be associated with content on the provider pages, the advertising manager 218 can store the advertising data to an advertising data store 220, which in some embodiments can comprise separate tables in the production data store 208. The advertising data store can include any information related to advertising, such as ad performance data, bid histories, bid amounts, categorizations, creative elements, etc. Portions of this data alternatively can be stored and/or accessed from other appropriate storage devices of the system and/or across the network. The content provider system also can include a synchronization manager 216 that can work with a corresponding synchronization manager 228 of the advertiser 204 to periodically synchronize the advertising data with the advertising data stored at the provider 202, such that the appropriate landing pages, creative content, and financial information can be designated and updated as desired. When a client device 206 displays a page of content served by the primary content provider 202, the page can include an advertisement that can in some instances direct the user to a page of the advertising entity 204 upon selection by the user. In other cases, the user 206 can be directed to a page of content from the primary content provider 202 that relates to the advertisement. In still other cases, the content provider might credit the user or offer the user a promotion in exchange for watching the advertisement from the advertiser, which can relate to a product or service offered by the advertiser.

The example environments illustrated can include a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 2. Thus, the depiction of the system 200 in FIG. 2 should be taken as being illustrative in nature and not limiting to the scope of the disclosure. An environment such as that illustrated in FIG. 2 can also be useful for a content provider or publisher, such as an electronic retailer or a provider of an electronic marketplace, wherein multiple associates or other content providers might wish to advertise on pages for the marketplace itself, in addition to ads from the provider of the marketplace.

As mentioned, for conventional approaches the client device 206 would request primary content provided by the content provider 202. Information for the request would be directed to the page generator, which could use information from the production data to determine the primary content to be provided. The page generator 210 can also work with the advertising manager 218 to determine, based upon performance data or other such metrics, which types of advertising to display along with the content. The page generator 210 can then generate the code for the page, including the appropriate header, footer, tags, and other information to cause the appropriate content to be rendered in the appropriate location on the page. For the advertisements, the page generator 210 can include links or other identifiers that indicate where ads should be placed, and indicates a source or address from which the advertising content should be obtained. The page server 212 can then cause the page content, including the primary content, to be transmitted to the client device 206. Upon receiving the page content, the browser application can analyze the page content and make the appropriate call(s) to the ad provider 204 for the advertising content to be displayed on the page.

As mentioned, using this conventional approach the browser would cause one or more calls to be made across at least one network 214 to be received to the ad provider 204. As mentioned, there can be one call for each ad to be displayed, and the ads can be sent to the same ad provider or to at least some different sources. An ad server 222 of the ad provider environment can analyze the information for the request and identify the appropriate ad content to be provided in response to the request. The ad content can be obtained from an ad data repository 226 or generated by an ad generator 224, among other such options. Once obtained, the ad server 222 can cause the ad content to be sent to the client device 206 and rendered by the browser application to appear with the primary content on the rendered page.

Figure 3A:
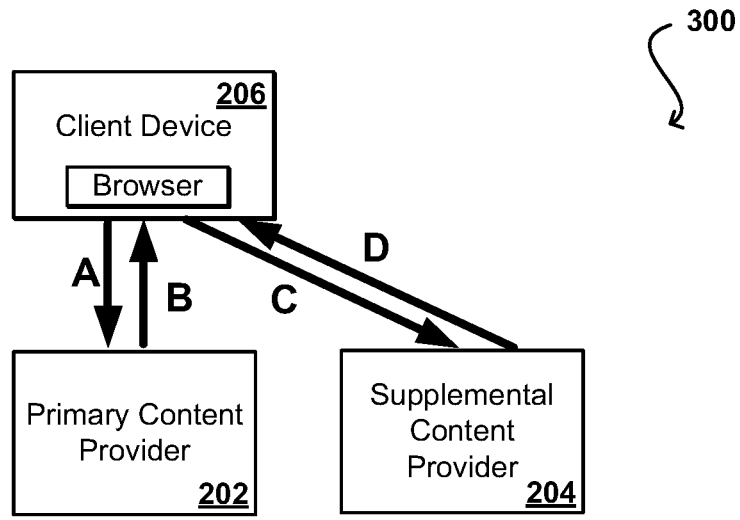
FIGS. 3A and 3B illustrate example communication flows that can be utilized in accordance with various embodiments.

FIG. 3A illustrates an example message flow 300 that illustrates a simplified overview of the process described with respect to FIG. 2. In this example, the client device would submit a first request (A) for content that would be received to the primary content provider 202. It should be understood that reference numbers for similar elements may be carried over between figures for purposes of explanation, but that such usage should not be interpreted as a limitation on the scope of the various embodiments unless otherwise stated. The primary content provider 202 will determine the appropriate page content, including the primary content and links or identifiers for the supplemental content, and send one or more responses (B) to the client device 206 to enable the browser application to render the page of content. Because the supplemental content is not included with the response (B) from the primary content provider, the client device 206 will have to send a separate request (C) to the identified supplemental content provider 204, such as an ad provider, for the supplemental content to display with the primary content. As mentioned, the client device 206 can submit one such call for each instance of supplemental content to be displayed on the device. The request (C) can be received by the supplemental content provider 204 which can determine the appropriate supplemental content and send that content via one or more responses (D) back to the client device 206.

As illustrated, once the primary content is sent from the primary content provider 202 to the client device 206, the primary content provider 202 is no longer involved in the process. The supplemental content provider 204 provides supplemental content, such as advertising, to the client device based on information provided by the client device. These separate calls (C) and (D) also occur after the primary content response (B) has been received by the client device, which results in additional latency before the full page of content can be rendered and displayed via the client device 206.

Figure 3B:
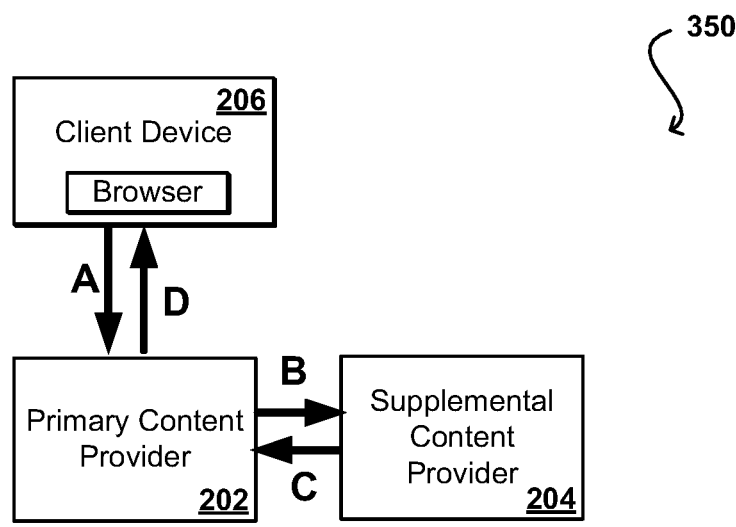

Accordingly, approaches in accordance with various embodiments can adjust the message flow as illustrated in the example flow 350 of FIG. 3B, such that the supplemental content is provided to the primary content provider 202 for incorporation with the primary content before the primary content is provided to the client device. This enables the primary content to make better selections related to supplemental content, as well as to adjust the layout or selection of primary content. The user experience can be further improved by reducing the latency needed to render the page of content, as the client device will not have to wait for the supplemental content to be obtained after receiving the primary content. In this example, the client device 206 still sends the initial request (A) for content to the primary content provider 202. The content provider 202 then sends a request (B) for supplemental content directly to the supplemental content provider 204, instead of having the client device request the supplemental content. The request (B) can include various types of information obtained from the initial request, including the IP address of the client device, the URL for the request, the user agent identifier, and a publisher cookie, among other such options. As mentioned, the publisher cookie can be used to store a unique ID synchronized with the ad provider. The supplemental content provider 204 can then provide a response (C) that either includes the supplemental content or information about available supplemental content from which the primary content provider 202 can make one or more selections. In some embodiments, the request (C) can include header and/or footer code (e.g., HTML) fragments to be inserted in the page HTML sent to the browser or device. The header HTML can be inserted in the <head></head> section of the webpage, for example, and the footer HTML can be inserted at the end of the <body></body> section of the page. The footer fragment may contain <script> . . . </script> tags to synchronize cookies when needed. As mentioned, the footer fragment in many cases will only be returned if a footer cookie-synchronization is required. Other information may be included in the response from the ad provider as well, as may include a status code indicating whether the request was successful, even if no supplemental content was returned. Error message information may also be returned in the event of an error.

The primary content provider 202 can then determine the supplemental content to be included, make any adjustments to the selection or layout of the primary content, and send the primary content and supplemental content together in a response (D) to the client device 206, whereby the client device 206 can render the primary and supplemental content together without having to make additional calls for the supplemental content. It should be understood, however, that in some embodiments the primary content provider can obtain information about the supplemental content in order to determine selection, layout, and other such aspects, but the client device might still obtain image or other creative content from a supplemental content provider according to the determined layout and selection. In some Web-based applications a script library, such as a JavaScript library, may be needed to handle server-side responses as well as the regular header calls. If not already there, a JavaScript Library can be inserted in the content before the header HTML fragment returned by the server. This JavaScript library may be hosted on a CDN (Content Delivery Network) and cached by the browser most of the time, thus only adding a negligible amount of overall latency (zero latency when cached).

Figure 4:
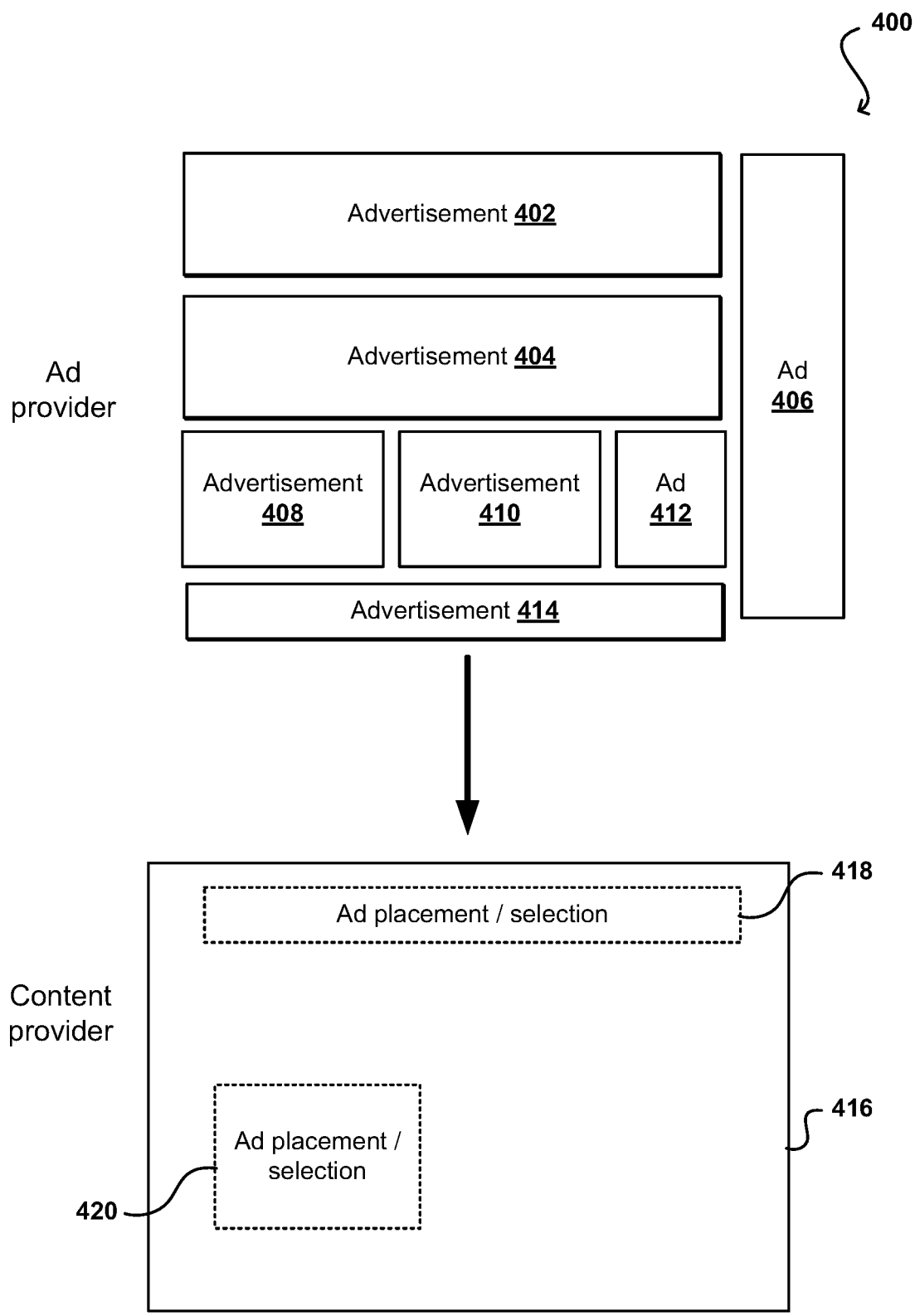
FIG. 4 illustrates an example configuration of primary content based upon available supplemental content that can be generated in accordance with various embodiments.

As mentioned, in some embodiments the primary content provider can make layout and other decisions based at least in part upon the available supplemental content. For example, the situation 400 in FIG. 4 illustrates a set of possible advertisements 402, 404, 406, 408, 410, 412, 414 that could be displayed with a layout 416 of primary content. These could be selected based on various criteria set out by the content provider or associated with a user identifier, and in some cases may involve bidding or other ad selection processes. Upon receiving the selection of relevant ads, the content provider can determine which of the ads to display with the primary content, and can determine the locations and sizes of regions 418, 420 where those ads are to be displayed. This can all be done server side, before any content is sent to the client device. This enables the primary content provider to have dynamic control over layout and selection of content, as opposed to static conventional layouts, and also enables the content provider to make better decisions regarding the criteria used for ads or other supplemental content on a page or other such display.

As mentioned, one of the difficulties in server-side content management is that the server will not often have an identifier readily available to use to select the supplemental content appropriate for the end user or device. As mentioned, approaches in accordance with various embodiments can provide server-side APIs 232, as part of an interface layer 230, that can integrate with publisher content management systems and content-delivery networks. These APIs can be called by the content servers or content delivery networks, and the responses can be embedded and/or encoded in the content. In order to account for the lack of an identifier, the API can return a two-part response payload (e.g., a JSON payload); with one part corresponding to the supplemental content itself. This can be returned and encoded in a "header" in at least some embodiments. An optional second portion can be used to automatically create a usable browser/device ID for supplemental content. This ID can be synchronized with the supplemental content provider system, returned and encoded as a "footer," although in some embodiments the information can be combined into a single header or other such part or portion. Primary content publishers can be instructed to emit the footer and header in the primary content at the appropriate places. When and if the response footer renders, the browser or device can perform the steps to synchronize the advertising ID between the supplemental provider system and a publisher cookie. This cookie can be sent in the next server-side call for supplemental content to represent the browser/device as a proxy identifier for advertising purposes, simulating a regular client-side call but without the latency cost associated with client-side calls. In addition to the publisher cookie, which includes a representation of a unique device identifier or browser ID that has been placed on the domain (e.g., foo.com) through a prior interaction with that site, a subsequent request for supplemental content can included the URL or other address (e.g., an IP address) for the page of content that is actually being rendered, and can also include an authentication token. The authentication token can be processed by the supplemental content provider system to verify that the request for supplemental content is being received from a server associated with a particular domain that is calling a system endpoint or interface. A significant difference between this approach and conventional approaches lies in the use of the authentication cookie received from the primary content provider or publisher, as the server side ad provider in the present approach must trust the entity submitting the request, which in this case is the primary content provider.

As mentioned, in some embodiments an ad provider can return information about the potential ads to be displayed, as may relate to price, size, content, type, and the like. The primary content provider can then make one or more selections and then send a request for those selections to the ad provider. In other embodiments the ad server might return all relevant ad content, as may include the final HTML and/or image content for an advertisement, that the primary content provider can select to place on a page of content. In some embodiments the primary content provider can send a request with information for all ad locations on a page, and the ad provider can send back all relevant supplemental content for the page, including the creative content that will be displayed in the page of content. A publisher receiving the supplemental content can inject this content into the main page content in the appropriate way. As mentioned, this can include sending to the publisher a header fragment and a footer fragment, and the publisher injects those fragments into the page header and footer. The content can then be composed by the publisher and streamed or otherwise transmitted to the browser without need to separately fetch the content for each ad using an extra call.

If the primary content provider has not previously interacted with the user or client device, the publisher cookie might be empty or otherwise not include a device identifier. If the cookie is blank, the ad provider might only return a footer, such as a piece of JavaScript which can place a unique ID on the publisher cookie that can be mapped to an advertising ID using a cookie match or other such process. When the image including a cookie match pixel renders on the publisher site, the image can cause the client ID and/or publisher cookie to be sent to the ad provider. The ad provider can then map the two IDs on the backend such that when the next request comes from the publisher, the publisher cookie can be mapped to the advertising ID, which itself is mapped to the customer. The ability to automatically obtain cookie match results is another benefit of approaches presented herein.

In some embodiments, the primary and supplemental content providers can share information that is available due at least in part to the integration. This can include, for example, monetization information and traffic quality, among other such parameters. Information about a particular request, such as the likelihood of the request corresponding to a robot or a high priority user, can also be provided. This can help make decisions on the amount and/or type of content to show before content is ever sent to a client device.

For example, fraud is a big problem in the ad industry. In client-side integration it can be difficult to handle fraud, as the options are limited and generally include simply not returning an ad to be displayed. In server side integration that includes cooperation with a publisher, a determination might be made to remove all the ads for a given page or flag the page as possibly robotic. Similarly, ads that will do less damage or be less exposed to fraud might be selected for display. For high value users, different ads might be selected to attempt to convert on the opportunity, or a fewer number of ads shown because the user is already a high value user, among other such options.

Further, it is possible to send recommendations to a publisher as to the number of slots to be used for advertising on a page, as well as the size, arrangement, or other such information. Since most content systems have the concept of a slot or widget, and a system knows which one is going to be rendered naturally in a page or document, the server side can be educated as to how many slots should be on a particular page and whether those slots should be filled with ads, which size ads should take priority, etc. Such an approach helps to customize the look and layout before the content is sent to the browser instead of finding out what is available and rendered in the browser. Further, the content provider has more ability to dynamically adjust layout and content selection based on the information received from the ad provider. In some embodiments the ad provider can provide hierarchies or packages of advertising to send to the publisher, where each can provide information and/or recommendations for improving monetization. This can include information regarding adding or removing a slot, changing slot placement on the page, changing slot size, etc. The recommendations can be provided at different levels as well, such as for an overall recommendation, a page-specific recommendation, a user-specific recommendation, and the like. Different layouts may also be suggested for different types of users or devices.

Figure 5:
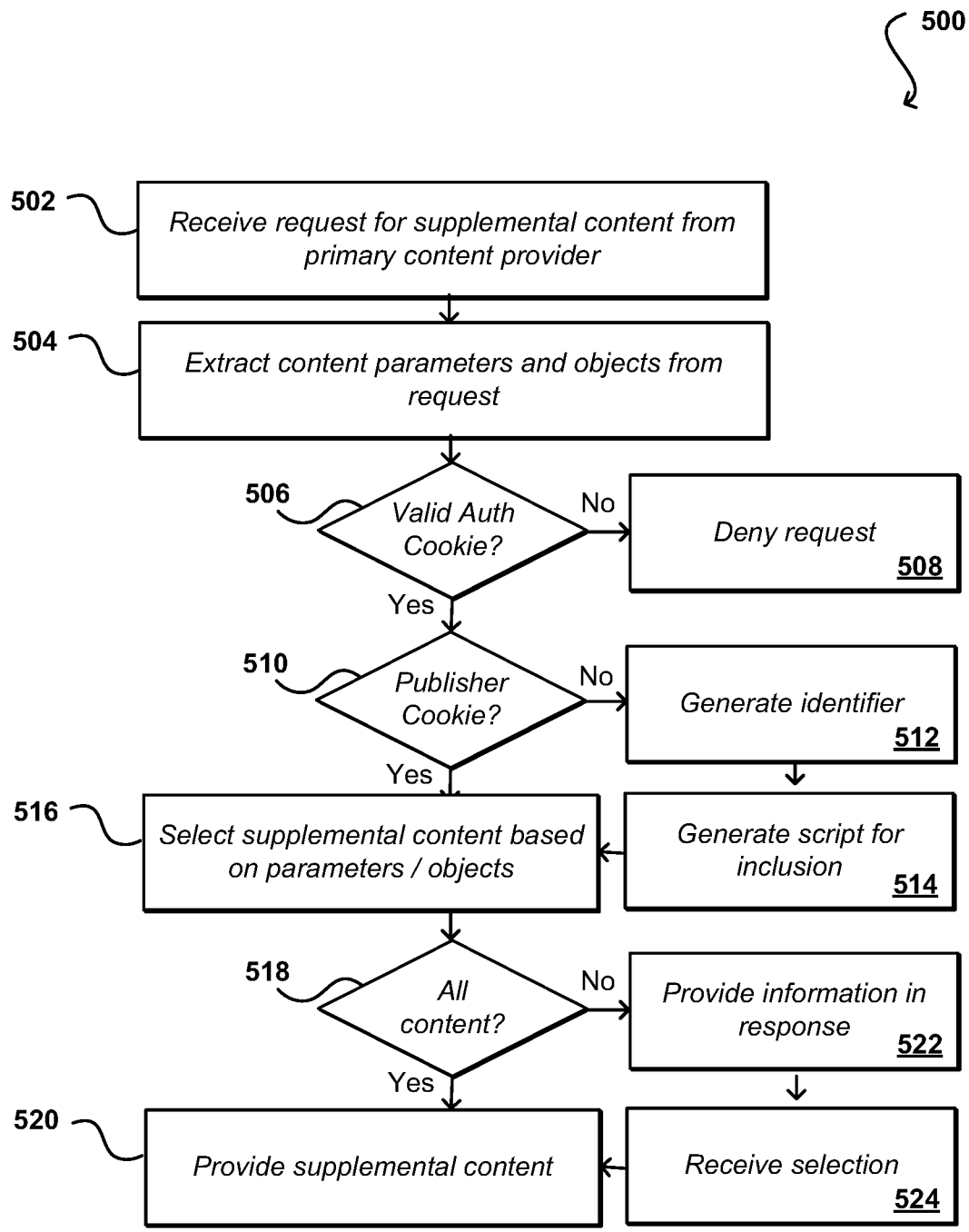
FIG. 5 illustrates an example process for providing supplemental content to a content provider that can be utilized in accordance with various embodiments.

FIG. 5 illustrates an example process 500 for providing supplemental content through server-side calls that can be utilized in accordance with various embodiments. It should be understood that for this and other processes discussed herein that there can be additional, fewer, or alternative steps performed in similar or alternative orders, or in parallel, within the scope of the various embodiments unless otherwise specifically stated. In this example, a supplemental content provider, such as an advertising entity, can receive 502 a request for supplemental content from a primary content provider. The supplemental content provider system can extract 504 the relevant request data from the request, as may include an IP address, a URL, a publisher cookie, and an authentication cookie among other such information. A determination can be made 506 as to whether a valid authentication cookie was included in the request. This can be used to verify an identity of primary content provider from whom the request was received. If a valid authentication cookie was not included, the request for supplemental content can be denied 508. If a valid authentication cookie was included, another determination can be made 510 as to whether a publisher cookie was included with the request. As mentioned, a publisher cookie can include a user or device identifier that serves as a proxy identifier for the request, enabling the supplemental content provider to provide targeted content even though the request was not received from a client-side device associated with the user. If a publisher cookie was not included, a new proxy identifier can be generated 512 and script can be included 514 in the response to cause a publisher cookie including that identifier to be included with any subsequent requests for supplemental content for that user, application, or device. As mentioned, in at least some embodiments, script can also be included in a response to the client device to synchronize the cookie information based on ads that were displayed and other such information.

Based at least in part upon the information for the request, one or more instances of supplemental content can be selected 516 to provide in response. As mentioned, these can be selected based upon information known for the user, device, application, publisher, URL, or other such information, as may include past browse history, past purchase history, and the like. A determination can be made 518 as to whether the publisher wants all the supplemental content. If so, the creative information for all the supplemental content can be provided 520 to the publisher in, or associated with, the response to the publisher. The publisher can then decide which supplemental content to be utilized, and the selections can be synchronized with the supplemental content provider for targeting and payment purposes, among others. If not all content is to be provided, the supplemental content provider can provide 522 information about the supplemental content, such as price (e.g., price codes) and content information, and a subsequent request can be received 524 from the publisher for the content, which can then be provided by the supplemental content provider to the publisher, who can then cause the supplemental content to be transmitted to the client device for display with the primary content.

Figure 6:
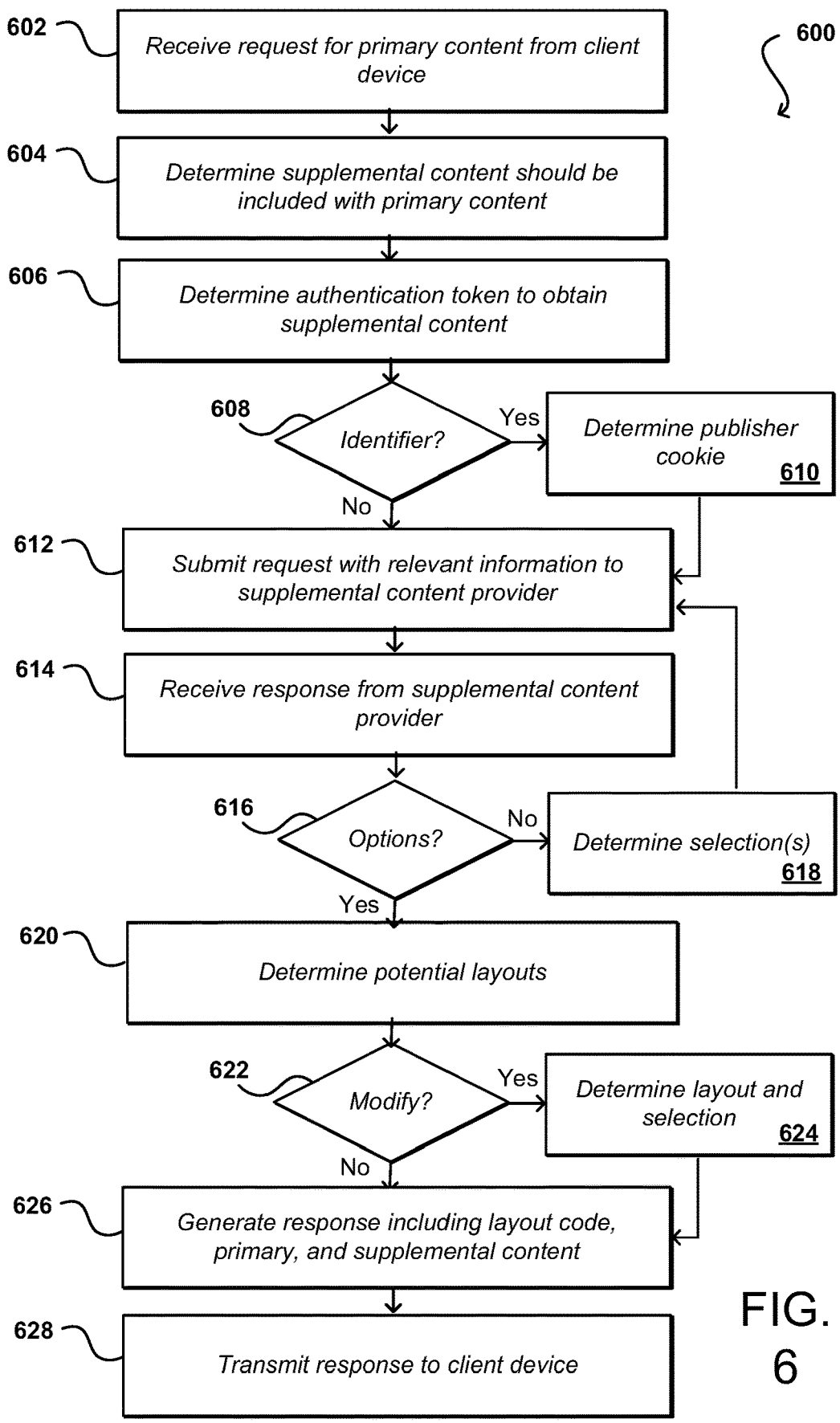
FIG. 6 illustrates example process for determining layout of primary content based at least in part upon available supplemental content that can be utilized in accordance with various embodiments.

FIG. 6 illustrates an example process 600 for including supplemental content with primary content to be presented via a client device that can be utilized in accordance with various embodiments. In this example, a request for primary content is received 602 to a primary content provider. As mentioned, the request can correspond to a particular URL or other address or source, and can include identifying information for the user, browser, or device if available. The primary content provider can determine 604 that the response should include both the requested primary and at least some supplemental content, such as advertising. The primary content provider can determine 606 the appropriate authentication token to be used to request the supplemental content. If the identifier for the request is determined 608 to be available, then a publisher cookie for the request can be identified 610 for inclusion. In some cases a publisher cookie will always be included, but may be blank if no identifier is available. The primary content provider can then submit 612 a request for supplemental content to a supplemental content provider, where that request can include the authentication token, the publisher cookie if available, and other relevant information such as the URL and source IP address.

Subsequently, a response can be received 614 from the supplemental content provider. A determination can be made 616 as to whether the response includes option information or the supplemental content itself. If option information, the primary content provider can determine 618 which supplemental content to select and another request can be sent to the supplemental content provider for the supplemental content. As mentioned, the selection can be based upon content layout determinations, pricing data, and other such information. Once the supplemental content is obtained, the primary content provider can analyze 620 the potential layouts for the primary and supplemental content. A determination can be made 622 as to whether or not to modify or customize the layout. If so, the layout can be determined 624 based at least in part upon the supplemental content and information for the supplemental content. This can include, for example, a recommended number of slots, slot sizes or slot locations, among other such factors. Once the layout is determined, the response can be generated 626 that includes the code for the page (or other content display) along with the primary and supplemental content, and that response can be transmitted 628 for presentation via the client device. As mentioned, certain information or script can be placed in appropriate places in the provided code, which can cause tasks to be performed such as to synchronize identifiers or supplemental content data, among others.

Figure 7:
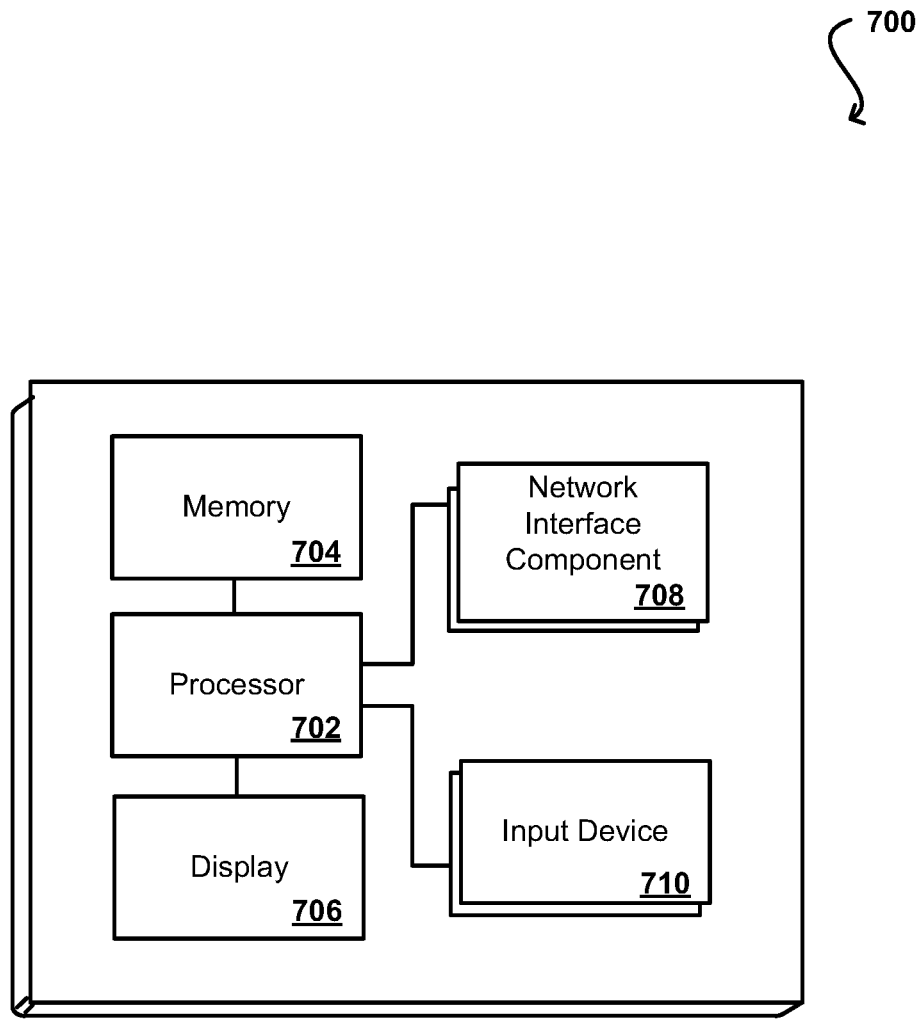
FIG. 7 illustrates a logical arrangement of a set of general components of an example computing device that can be used to implement aspects of the various embodiments.

FIG. 7 illustrates a logical arrangement of a set of general components of an example computing device 700. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one input element 710 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 700 of FIG. 7 can include one or more network interface elements 708 for communicating over various networks, such as a Wi-Fi, Bluetooth, RF, wired, or wireless communication systems. The device in many embodiments can communicate with a network, such as the Internet, and may be able to communicate with other such devices.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media known or used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:

under control of one or more computer systems configured with executable instructions, receiving, to a supplemental content provider from a primary content provider, a supplemental content request for supplemental content to be displayed with primary content to be provided to a client device, the request including at least a content identifier for the primary content;

generating a client identifier to be associated with the client device;

determining, based at least in part upon the content identifier and the client identifier, one or more instances of supplemental content determined to be relevant for the supplemental content request; and providing at least a subset of the one or more instances of supplemental content to the primary content provider, a given instance of supplemental content provided via a two-part payload, wherein a first part of the two-part payload is a header including the supplemental content and a second part of the two-part payload is a footer including the client identifier, wherein the primary content provider is enabled to determine at least one of a selection or a layout of the supplemental content with respect to the primary content before causing the primary content and the supplemental content to be sent for presentation via the client device.

2. The computer-implemented method of claim 1, wherein the supplemental content is provided to the primary content provider for transmission with the primary content to the client device.

3. The computer-implemented method of claim 1, further comprising:
sending information for the one or more instances of supplemental content to the primary content provider, the information including at least price information or size information; and
receiving, from the primary content provider, a subsequent request identifying the subset of the one or more instances of supplemental content to be provided to the primary content provider.

4. The computer-implemented method of claim 1, further comprising:
exposing an application programming interface (API) to the primary content provider enabling the primary content provider to have the supplemental content provided to the primary content provider instead of directly to the client device.

5. The computer-implemented method of claim 1, wherein the client identifier is synchronized between the primary content provider and the supplemental content provider, the client identifier being a proxy identifier for an identifier used by the client device.

6. A computer-implemented method, comprising:
under control of one or more computer systems configured with executable instructions,
receiving a request to provide supplemental content to a primary content provider;
determining a client identifier associated with a client device via which the supplemental content is to be presented;
determining, based at least in part upon the client identifier, the supplemental content to be provided to the primary content provider; and
providing the supplemental content to the primary content provider, the supplemental content provided via a two-part payload, wherein a first part of the two-part payload is a header including the supplemental content and a second part of the two-part payload is a footer including the client identifier, wherein the primary content provider is able to cause the supplemental content to be transmitted with the primary content to the client device.

7. The computer-implemented method of claim 6, further comprising:
sending information for the supplemental content to the primary content provider, the information including at least price information or size information; and
receiving, from the primary content provider, a subsequent request identifying specific supplemental content to be provided to the primary content provider.

8. The computer-implemented method of claim 6, further comprising:
providing one or more suggestions to the primary content provider regarding at least one of a selection, a placement, or a number of instances of the supplemental content to be provided with the primary content, wherein the primary content provider is enabled to adjust at least one of the selection, the placement, or the number of instances of the supplemental content before providing the primary content and the supplemental content to the client device.

9. The computer-implemented method of claim 8, wherein the one or more suggestions is based at least in part upon projected monetization values for the supplemental content.

10. The computer-implemented method of claim 8, wherein the one or more suggestions includes modifying the inclusion of supplemental content based upon a determined trustworthiness of the client device, wherein the primary content provider is enabled to modify or withhold the supplemental content to be provided with the primary content to the client device.

11. The computer-implemented method of claim 6, further comprising:
determining whether a publisher cookie was received with the request and includes the client identifier; and
generating the client identifier if the client identifier was not received in a publisher cookie with the request.

12. The computer-implemented method of claim 11, further comprising:
providing, with the supplemental content, script causing the client identifier to be synchronized with the primary content provider for use with subsequent requests for supplemental content related to the client device.

13. The computer-implemented method of claim 6, wherein the supplemental content is provided to the primary content provider for transmission with the primary content to the client device.

14. The computer-implemented method of claim 6, further comprising:
exposing an application programming interface (API) to the primary content provider enabling the primary content provider to have the supplemental content provided to the primary content provider instead of directly to the client device.

15. The computer-implemented method of claim 6, wherein the supplemental content includes at least one of text, graphics, image, gaming, audio, or promotional content.

16. A system comprising:
at least one processor; and
a memory device including instructions that, when executed by the at least one processor, cause the system to:
receive a request to provide supplemental content to a primary content provider;
determine a client identifier associated with a client device by which the supplemental content is to be presented;
determine, based at least in part upon the client identifier, the supplemental content to be provided to the primary content provider; and
provide the supplemental content to the primary content provider, the supplemental content provided via a two-part payload, wherein a first part of the two-part payload is a header including the supplemental content and a second part of the two-part payload is a footer including the client identifier, wherein the primary content provider is able to transmit the supplemental content with the primary content to the client device.

17. The system of claim 16, wherein the instructions when executed further cause the system to:
send information for the supplemental content to the primary content provider, the information including at least price information or size information; and
receive, from the primary content provider, a subsequent request identifying specific supplemental content to be provided to the primary content provider.

18. The system of claim 16, wherein the instructions when executed further cause the system to:
provide one or more suggestions to the primary content provider regarding at least one of a selection, placement, or number of instances of the supplemental content to be provided with the primary content, wherein the primary content provider is enabled to adjust at least one of the selection, placement, or number of instances of the supplemental content before providing the primary and supplemental content to the client device.

19. The system of claim 16, wherein the instructions when executed further cause the system to:
   determine whether a publisher cookie was received with the request and includes the client identifier; and
   generate the client identifier if the client identifier was not received in a publisher cookie with the request.

20. The system of claim 16, wherein the instructions when executed further cause the system to:
   expose an application programming interface (API) to the primary content provider enabling the primary content provider to have the supplemental content provided to the primary content provider instead of directly to the client device.

* * * * *